US011981012B2

(12) United States Patent
Bayha et al.

(10) Patent No.: US 11,981,012 B2
(45) Date of Patent: May 14, 2024

(54) HAND-HELD POWER TOOL

(71) Applicant: Robert Bosch GmbH, Stuttgart (DE)

(72) Inventors: Timo Bayha, Wolfschlugen (DE); Jan Koalick, Leinfelden-Echterdingen (DE); Lars Schmid, Nuertingen (DE); Michael Weiss, Stuttgart (DE); Nadine Mutlu, Weil Im Schoenbuch (DE); Patrick Heinen, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 178 days.

(21) Appl. No.: 17/381,895

(22) Filed: Jul. 21, 2021

(65) Prior Publication Data

US 2022/0048177 A1 Feb. 17, 2022

(30) Foreign Application Priority Data

Aug. 12, 2020 (DE) ..................... 10 2020 210 250.3

(51) Int. Cl.

| | |
|---|---|
| ***B25D 16/00*** | (2006.01) |
| ***B01F 13/00*** | (2006.01) |
| ***B01F 15/00*** | (2006.01) |
| ***B01F 33/501*** | (2022.01) |
| ***B01F 35/32*** | (2022.01) |
| ***B25D 17/08*** | (2006.01) |

(52) U.S. Cl.

CPC ...... *B25D 16/006* (2013.01); *B01F 33/50115* (2022.01); *B01F 35/32025* (2022.01); *B01F 35/3204* (2022.01); *B25D 17/084* (2013.01); *B25D 2216/0084* (2013.01); *B25D 2222/72* (2013.01); *B25D 2250/005* (2013.01); *B25D 2250/091* (2013.01); *B25D 2250/131* (2013.01); *B25D 2250/221* (2013.01)

(58) Field of Classification Search

CPC ................ B25D 16/006; B25D 17/084; B25D 2216/0084; B25D 2222/72; B25D 2250/005; B25D 2250/091; B25D 2250/121; B25D 2250/131; B25F 3/00; B01F 33/50115; B01F 33/32025

See application file for complete search history.

(56) References Cited

U.S. PATENT DOCUMENTS 3,166,303 A * 1/1965 Chapman ................ B01F 33/86 416/200 R
3,828,863 A * 8/1974 Bleicher .................. H02K 7/10 173/48

(Continued)

FOREIGN PATENT DOCUMENTS

CN 206184295 U * 5/2017 ................ B01F 7/00
DE 103 21 869 A1 12/2004

(Continued)

*Primary Examiner* — Thanh K Truong
*Assistant Examiner* — David G Shutty
(74) *Attorney, Agent, or Firm* — Maginot, Moore & Beck LLP

(57) ABSTRACT

A hand-held power tool includes a housing in which a drive unit and an impact-mechanism unit are arranged. The hand-held power tool further includes a tool-receiver interface configured to releasably connect with a tool receiver, the tool receiver configured as a stirrer-basket receiver. A user interface is configured to set at least one of a rotary-hammer mode and a stirring mode for the hand-held power tool.

10 Claims, 3 Drawing Sheets

(56) References Cited

U.S. PATENT DOCUMENTS

| | | | | |
|---|---|---|---|---|
| 4,054,272 | A * | 10/1977 | Cooke | B01F 27/0724 D15/147 |
| 5,050,687 | A * | 9/1991 | Prokhorov | B25D 17/06 173/133 |
| 6,536,536 | B1 * | 3/2003 | Gass | B25F 5/021 173/171 |
| 6,616,318 | B1 * | 9/2003 | LeBlanc | B01F 27/0724 366/328.2 |
| 7,137,457 | B2 * | 11/2006 | Frauhammer | B23Q 3/12 173/132 |
| 7,497,272 | B2 * | 3/2009 | Strasser | B25D 16/006 173/4 |
| 7,513,678 | B2 * | 4/2009 | Venus | B01F 33/5011 366/605 |
| 7,591,324 | B2 * | 9/2009 | Saur | F16D 21/04 173/217 |
| 2001/0052416 | A1 * | 12/2001 | Wissmach | B23Q 3/15546 173/4 |
| 2003/0188877 | A1 * | 10/2003 | Saur | B25D 17/088 173/15 |
| 2004/0245731 | A1 * | 12/2004 | Frauhammer | B25D 17/088 279/19 |
| 2009/0308626 | A1 * | 12/2009 | Saur | B25D 16/006 173/160 |
| 2016/0129578 | A1 * | 5/2016 | Sprenger | B25F 5/001 173/1 |
| 2016/0325391 | A1 * | 11/2016 | Stampfl | H04Q 9/00 |
| 2018/0354114 | A1 * | 12/2018 | Bantle | B25B 21/02 |
| 2019/0321960 | A1 * | 10/2019 | Czirjak | B25B 23/147 |

FOREIGN PATENT DOCUMENTS

| | | | | | |
|---|---|---|---|---|---|
| DE | 10 2004 012 433 | A1 | | 9/2005 | |
| DE | 10 2005 005 146 | A1 | | 8/2006 | |
| DE | 102006002955 | B4 | * | 12/2009 | B01F 13/002 |
| DE | 102016211733 | A1 | * | 1/2018 | B01F 13/002 |
| DE | 20 2018 100 179 | U1 | | 3/2018 | |
| EP | 2011607 | A1 | * | 1/2009 | B01F 13/002 |
| EP | 2283977 | A1 | * | 2/2011 | B23B 13/002 |

* cited by examiner

HAND-HELD POWER TOOL

This application claims priority under 35 U.S.C. § 119 to application no. DE 10 2020 210 250.3, filed on Aug. 12, 2020 in Germany, the disclosure of which is incorporated herein by reference in its entirety.

BACKGROUND

DE 103 21 869 A1 describes a rotary hammer that has an exchangeable tool holder.

SUMMARY

The disclosure relates to a hand-held power tool, having a housing, in which a drive unit and an impact-mechanism unit are arranged, a tool-receiver interface designed for releasably connecting the hand-held power tool to a tool receiver, the tool receiver being realized as a stirrer-basket receiver. It is proposed that the hand-held power tool have a user interface via which at least a rotary-hammer mode and a stirring mode can be set. Advantageously, the hand-held power tool can thus be optimally adapted to the intended use. The hand-held power tool may be realized as a mains-powered hand-held power tool or as a battery-powered hand-held power tool that can be connected to a battery pack for power supply.

A hand-held power tool in this context is to be understood to mean, in particular, an appliance for performing work on workpieces by means of an electrically driven insert tool. Typical hand-held power tools in this context are hand-held or bench power drills, screwdrivers, impact drills, rotary hammers or the like.

The tool receiver is designed, in particular, for releasably fastening an insert tool. The tool receiver, which is releasably connected via the tool-receiver interface, is in particular realized in such a manner that a user can change the tool receiver without tools or by means of a tool. Different tool receivers are known to persons skilled in the art. For example, tool receivers in the form of quick-action drill chucks for rotary hammers, or tool receivers in the form of SDS-plus hammer chucks, are known. The tool-receiver interface has force-fit and/or form-fit locking elements that can be releasably connected to corresponding force-fit and/or form-fit locking elements of the tool receiver.

The housing of the hand-held power tool is realized at least partially, in particular completely, as an outer housing. The housing may be realized in one piece or in several pieces. The housing is made at least partially, in particular completely, from a plastic. Furthermore, the housing of the hand-held power tool may have an inner housing that is at least partially, preferably completely, enclosed by the outer housing.

The hand-held power tool preferably has a drive unit comprising an electric motor. The electric motor may be realized as a direct-current motor or as an alternating-current motor. The electric motor may be commutated electronically or by means of carbon brushes. The electric motor is mounted in the housing of the hand-held power tool so as to be rotatable about a motor axis. The drive motion of the drive unit, or of the electric motor, can be transmitted to the tool receiver, or to the insert tool, via a transmission unit. The impact-mechanism unit may be realized, for example, as a pneumatic impact mechanism or as a ratchet-controlled impact mechanism. The pneumatic impact mechanism may be realized, for example, as an eccentric impact mechanism or as a wobble impact mechanism. In particular, the impact mechanism has a guide tube, in which a striker and/or a piston are accommodated in a linearly movable manner. The piston is preferably designed to be driven in a linearly oscillating manner via the eccentric impact mechanism or the wobble impact mechanism. The transmission unit is realized in particular in such a manner that an insert tool connected to the tool receiver can be driven in rotation about and/or in a linearly oscillating or percussive manner along a working axis.

The user interface may be of a direct or indirect design. A direct user interface is to be understood to be a user interface in which setting is effected directly by the user, by means of an input. It is conceivable in this case for the stirring mode to be set by means of a single parameter, for example a rotational speed of the motor or of the tool receiver, or a stirring time, or by means of a plurality of parameters in combination, for example a rotational speed of the motor or of the tool receiver and a stirring time.

An indirect user interface is to be understood to mean a user interface in which an action of the user or a state of the hand-held power tool is sensed, and the hand-held power tool is set automatically on the basis of the sensed action or state. The hand-held power tool may have, for example, one or more sensors, via which an action of the user or a state of the hand-held power tool can be sensed. For example, the hand-held power tool may have a sensor in the form of a camera, via which the tool receiver, or an insert tool connected to the tool receiver, can be sensed. It is also conceivable that, via the sensor, an identification means or a barcode can be sensed, or scanned, by means of which individual parameters or a plurality of parameters can be set in combination. The indirect user interface may be realized in such a manner that the hand-held power tool is set completely automatically or semi-automatically. In this context, a semi-automatic setting is to be understood to mean a setting that is indicated to the user via a display, and that the user can confirm or change.

The hand-held power tool preferably comprises a set of electronics that is designed to control the hand-held power tool, in particular the drive unit of the hand-held power tool, by open-loop or closed-loop control. The set of electronics preferably has a printed circuit board on which electronic components such as, for example, a computing unit and memory unit, are arranged. Furthermore, the set of electronics has, in particular, at least one sensor element. The sensor element may be arranged on the printed circuit board or be arranged, connected to it, at another position in or on the housing of the hand-held power tool. The set of electronics may have a communication unit, by means of which the set of electronics can exchange information with another hand-held power tool, a hand-held power tool accessory, an external device, etc. The external device may be realized, for example, as a smartphone or as a server. The communication unit may be realized, for example, as a USB interface, i.e. wire-connected, or as a Bluetooth or WLAN interface, and thus wireless.

It is furthermore proposed that an idling rotational speed of the hand-held power tool can be set to at least one value, preferably to at least two values, via the user interface. The values of the settable idling rotational speed may be, for example, 200, 300, 400, 500 revolutions per minute. It is equally conceivable that the values of the idling rotational speed can be set by the user as required between a minimum speed, for example 200 revolutions per minute, and a maximum speed, for example 500 revolutions per minute. The idling rotational speed may be the idling motor rotational speed or the idling tool-receiver rotational speed at which the insert tool rotates about the working axis.

It is additionally proposed that a working rotational speed of the hand-held power tool can be set to at least one value, preferably to at least two values, via the user interface. Advantageously, an optimal stirring operation can thus be provided. The values of the settable working rotational speed may be, for example, 200, 300, 400, 500 revolutions per minute. It is likewise conceivable that the values of the working rotational speed can be set by the user as required between a minimum rotational speed, for example 200 revolutions per minute, and a maximum rotational speed, for example 500 revolutions per minute. The working rotational speed may be the working motor rotational speed or the working tool-receiver rotational speed at which the insert tool rotates about the working axis. Preferably, the hand-held power tool has a rotational-speed monitoring unit or a torque monitoring unit. The rotational-speed monitoring unit is designed, in particular, to sense and control the speed by open-loop or closed-loop control. The torque monitoring unit is designed to sense and control a torque by open-loop or closed-loop control. The rotational-speed monitoring unit and/or the torque monitoring unit are/is assigned, in particular, to the set of electronics of the hand-held power tool. The rotational-speed monitoring unit and/or the torque monitoring unit comprise/comprises at least one sensor element, for example a rotational-speed sensor or a current sensor.

It is furthermore proposed that the hand-held power tool be realized as a battery-powered hand-held power tool, and in particular have a battery interface for connection to a hand-held power tool battery pack. Advantageously, this allows the hand-held power tool to be used flexibly. The battery pack is realized, in particular, as a hand-held power tool battery pack. A battery interface is provided for connecting the battery pack to the hand-held power tool. The battery interface is preferably designed to accommodate a single battery pack on or in the hand-held power tool. Preferably, the hand-held power tool has a single battery interface. It is also conceivable, however, for the hand-held power tool to have a plurality of battery interfaces for connection to a plurality of battery packs. The battery interface is non-releasably connected to the housing of the hand-held power tool, in particular without use of tools. In particular, the hand-held power tool has only a single battery pack, in order to keep the total weight of the hand-held power tool and battery pack system as low as possible. The battery pack is designed, in particular, to supply power to the hand-held power tool. The battery pack has a housing, preferably made of plastic, in which at least one battery cell is arranged. The battery cell may be realized as a galvanic cell, having a structure in which one cell pole bears against one end and another cell pole bears against an opposite end. In particular, the battery cell has a positive cell pole at one end and a negative cell pole at an opposite end. Preferably, the battery cells are realized as NiCd— or NiMh—, particularly preferably lithium-based battery cells, or Li-ion, battery cells. The battery voltage of the battery pack is usually a multiple of the voltage of a single battery cell and results from the connection (parallel or serial) of the battery cells. The battery cells are arranged in a battery pack housing of the battery pack, in particular in layers, with one layer preferably having 5 battery cells. The battery pack may have a single layer, two layers, three layers or four layers. In particular, a height of the battery pack is greater than a width of the battery pack. The battery voltage of the battery pack is preferably 18 V or 36 V. The battery pack has a connection interface corresponding to the battery interface of the hand-held power tool. Via the connection interface, the battery pack can in particular also be connected mechanically and electrically to a charging device. The battery pack is realized, in particular, as an interchangeable battery pack.

It is furthermore proposed that the user interface have a communication unit that is designed for communication, in particular wireless communication, with an external device. The communication unit is in particular the set of electronics of the hand-held power tool. Advantageously, the hand-held power tool can thus be set by means of the external device.

It is additionally proposed that the user interface comprise an input unit, via which the user interface can be set, the input unit being arranged on the housing of the hand-held power tool or on the external device. The input unit has at least one operating element, which may be realized as a button, a keyboard, a knob, a touch-sensitive screen, a touch-sensitive housing surface or the like.

It is furthermore proposed that the user interface have a detection unit for sensing the tool receiver and/or for sensing an insert tool received in the tool receiver. It is thereby possible, advantageously, to realize an automatic setting of the hand-held power tool to the tool receiver used or to the insert tool used.

It is furthermore proposed that the stirrer-basket receiver is provided a screw thread, which is designed for connection to a stirrer basket. It is thereby possible, advantageously, to realize a secure connection of a stirrer basket in the tool receiver.

The disclosure additionally relates to a rotary hammer, having a housing, in which a drive unit and a pneumatic impact-mechanism unit are arranged, a tool receiver for releasably receiving an insert tool, a tool-receiver interface designed for releasably connecting the rotary hammer to the tool receiver. It is proposed that the tool receiver be realized as a stirrer-basket receiver. Advantageously, a powerful rotary hammer can thus additionally be used as a stirring appliance.

It is furthermore proposed that the rotary hammer have an impact-mechanism control that cannot be activated when having been connected to the stirrer-basket receiver. The impact-mechanism control may be effected electronically or mechanically.

BRIEF DESCRIPTION OF THE DRAWINGS

Further advantages are evident from the following description of the drawings. The drawings, the description and the claims contain numerous features in combination. Persons skilled in the art will also expediently consider the features individually and combine them to form appropriate further combinations.

There are shown.

DETAILED DESCRIPTION

Figure 1:
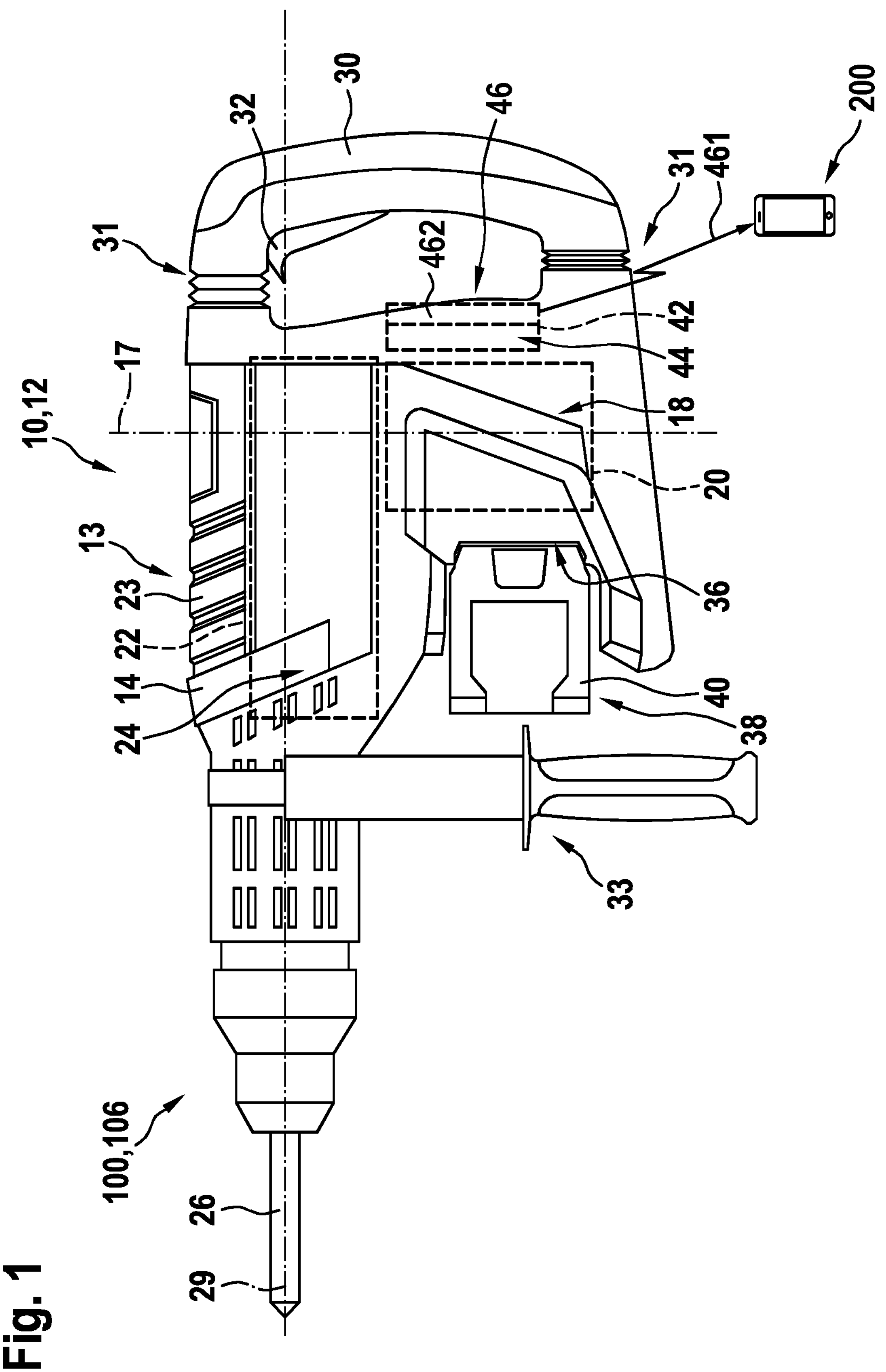
FIG. 1 a side view of a hand-held power tool.

FIG. 1 shows a side view of a hand-held power tool 10 in the form of a rotary hammer 12. The hand-held power tool 10 has a housing 13 that comprises an outer housing 14 and an inner housing (not represented). Arranged in the housing 13 of the hand-held power tool 10 is a drive unit 20, which comprises an electric motor 18 and which transmits a drive motion to a transmission unit 22 that has an impact mechanism 24. The impact mechanism 24 is realized, exemplarily, as a pneumatic impact mechanism.

The inner housing has a motor housing (not represented) and a transmission housing 23, which are enclosed by the outer housing 14. The transmission housing 23 accommodates the impact mechanism 24, in particular the transmission unit 22, substantially completely. The transmission housing 23 at least partially spans a grease chamber in which there is arranged a lubricant for lubricating the transmission unit 22. The motor housing is designed, in particular, to accommodate and/or support the electric motor 18. The transmission housing 23 is made, for example, of a material different from that of the rest of the outer housing 14. For example, the transmission housing 23 is made of a metallic material, while the motor housing and the outer housing 14 are made of a plastic. It is equally conceivable, however, for the transmission housing 23 to be made of a plastic. In particular, the transmission housing 23 and/or the motor housing have/has a higher strength and/or temperature resistance than the outer housing 14.

Via the transmission unit 22, the drive motion of the drive unit 20 is transmitted to a tool receiver 100 in which an insert tool 26 is releasably fastened. The insert tool is realized as a rock drill-bit for drilling holes in concrete. The insert tool 26 is designed to be driven in rotation about and/or in a linearly oscillating or percussive manner along a working axis 29. In addition, the insert tool 26 may be driven in clockwise or anticlockwise rotation. The working axis 29 extends, by way of example, in an intersecting manner, in particular substantially perpendicularly, in relation to a motor axis 17 of the drive unit 20.

The hand-held power tool 10 has a handle 30. The handle extends substantially perpendicularly in relation to the working axis 29. The handle 30 is arranged on a side of the housing 13 that faces away from the tool receiver 100. The handle 30 has an operating switch 32, via which the hand-held power tool 10 can be controlled manually, or can be switched on and off. The operating switch 32 is realized, exemplarily, as a signal switch. The handle 30 is realized, exemplarily, as a vibration-decoupled handle 30. In particular, the handle 30 is connected to the housing 13 of the hand-held power tool 10 via a damping unit 31. The handle 30 is connected to the housing 13 so as to be movable relative to the latter. Furthermore, the hand-held power tool 10 has an ancillary handle 33, which is releasably connected to the housing 13.

The hand-held power tool 10 is realized as a battery-powered hand-held power tool. By way of example, the hand-held power tool 10 has a battery interface 36, via which a battery pack 38 is electrically and mechanically connected to the hand-held power tool 10 so as to be releasable without use of tools. The battery pack 38 is arranged on a front side of the hand-held power tool 10 that faces towards the tool receiver 100. The battery pack 38 has a battery pack housing 40, in which battery cells (not represented) are arranged in three layers, each layer having, for example, five battery cells. Due to the number of layers, the battery pack 38 has a height perpendicular to the stacked layers that is greater than a width of the battery pack 38.

The tool receiver 100 is in particular designed as an interchangeable chuck 102. The interchangeable chuck 102 is releasably connected to the hand-held power tool 10 via a tool-receiver interface 104. Such tool-receiver interfaces 104 are known to persons skilled in the art and are described in various embodiments, and are available on the market.

The tool receiver 100 in the form of the interchangeable chuck 102 is connected via a force-fit and/or form-fit connection, which is designed to be releasable by the user of the hand-held power tool 10. Depending on the design of the interchangeable chuck 102, the connection may be designed to be releasable without use of tools or releasable by means of a tool (not represented).

Figure 2:
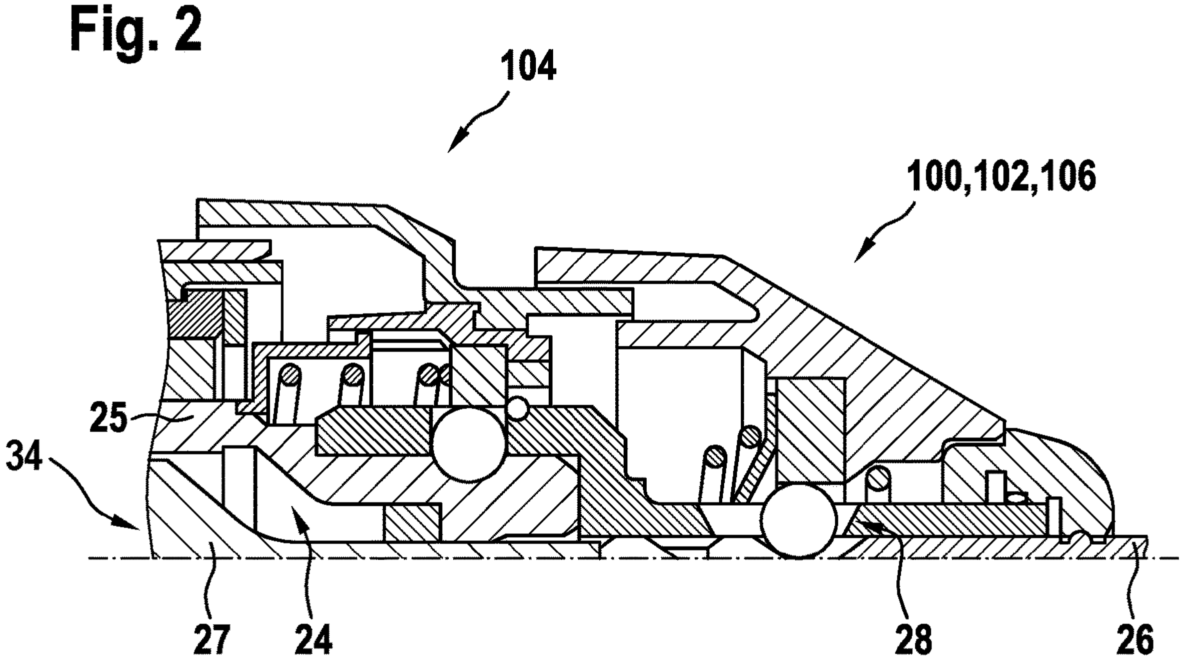
FIG. 2 a longitudinal section through an SDS-plus interchangeable chuck.

The interchangeable chuck 102 represented in FIG. 1 is realized as an SDS-plus interchangeable chuck 106, and in FIG. 2 is shown in a longitudinal section when having been connected to the hand-held power tool 10. An SDS-plus interchangeable chuck 106 is to be understood to be an interchangeable chuck 102 that is designed to receive, or releasably fasten, an insert tool 26 having an SDS-plus insertion end 28.

The impact mechanism 24 of the hand-held power tool 10 has a guide tube 25 realized as a hammer tube (see FIG. 2*a*), in which a piston (not represented) driven by an eccentric unit is guided for linear movement. The piston is designed to drive a striker (not represented) and a percussion pin 27 (see FIG. 2*a*), which is also mounted in a linearly movable manner in the guide tube 25. During the striking operation of the hand-held power tool 10, an air spring is formed between the striker and the piston. The impact mechanism 24 has an impact mechanism control; 34 via which the impact mechanism can be activated. The impact mechanism control 34 is realized mechanically by means of closable ventilation openings in the guide tube 25, the impact mechanism control 34 being effected by means of the percussion pin 27. The tool receiver 100, in particular the SDS-Plus interchangeable chuck 106, is realized in such a manner that the received insert tool 26, realized as a rock drill-bit, acts upon the percussion pin 27 with a force that displaces the percussion pin 27 into the guide tube 25. The displacement of the percussion pin 27 causes a vent of the guide tube 25 to be closed, such that, during operation, an air spring is created and the insertion tool 26 is driven in a linearly oscillating manner.

The hand-held power tool 10 additionally has a set of electronics 42 that is designed to control the hand-held power tool 10 by open-loop or closed-loop control. The set of electronics 42 comprises a printed circuit board comprising a computing unit in the form of a CPU, and a storage unit. The set of electronics 42 additionally comprises a plurality of sensor elements by means of which information on the state of the hand-held power tool 10 can be sensed. For example, the hand-held power tool 10 comprises a motion sensor in the form of an acceleration sensor. The acceleration sensor may be designed, for example, to distinguish an impact operating mode, or operation under load from an idling operation. It is also conceivable for the motion sensor to be design to sense and determine the orientation and position of the hand-held power tool 10 in space, or to sense and determine a rotation of the housing 13 of the hand-held power tool 10 about the working axis 29, for example in the case of impingement on a reinforcement. The sensed information of the motion sensor is provided to the set of electronics 42, which controls the drive unit 20 on the basis of the information.

The control may be effected, for example, by control of the working rotational speed or load rotational speed, or by a switch-off or active braking of the drive unit. The hand-held power tool 10 additionally comprises a rotational-speed sensor and a current sensor. The rotational-speed sensor is assigned to a rotational-speed monitoring unit. The rotational-speed sensor is realized, for example, as a Hall sensor. The current sensor is assigned to a torque monitoring unit.

Thus, the rotational speed of the hand-held power tool 10 can be determined and sensed both in operation under load and in idling operation, and can be controlled by open-loop or closed-loop control via the set of electronics 42.

In idling operation, the insert tool 26 in this case is driven at an idling rotational speed, with the insert tool 26 not being under load. This means that no work process, such as hole drilling or a screwing process or a stirring process, is taking place. In operation under load, the insert tool 26 is driven at a load rotational speed, with the insert tool being under load. The power consumption of the hand-held power tool 10 is in particular higher in operation under load than in idling operation. In operation under load, the insert tool 26 is used for hole drilling, screwing, stirring, etc.

The set of electronics 42 comprise a communication unit 44 designed for wireless communication 461 with an external device 200 such as, for example, a smartphone. The wireless communication 461 is effected, for example, via a Bluetooth connection. In particular, this allows the hand-held power tool 10 to be at least partially controlled via the external device 200.

The hand-held power tool 10 additionally comprises a user interface 46. The user interface 46 comprises an input unit 462, via which the user interface can be set, the input unit 462 being arranged on the housing of the hand-held power tool 10 in the illustrated embodiment, though in other embodiments the input unit is arranged on an external device 200. The user interface 46 comprises a screen, not represented further, and input elements, not represented further. Operating information or information on the state of the hand-held power tool can be displayed via the screen of the user interface 46. The display of the screen, and/or the set of electronics 42 and thus the hand-held power tool 10, can be set via the input via the input elements of the user interface 46.

Figure 3:
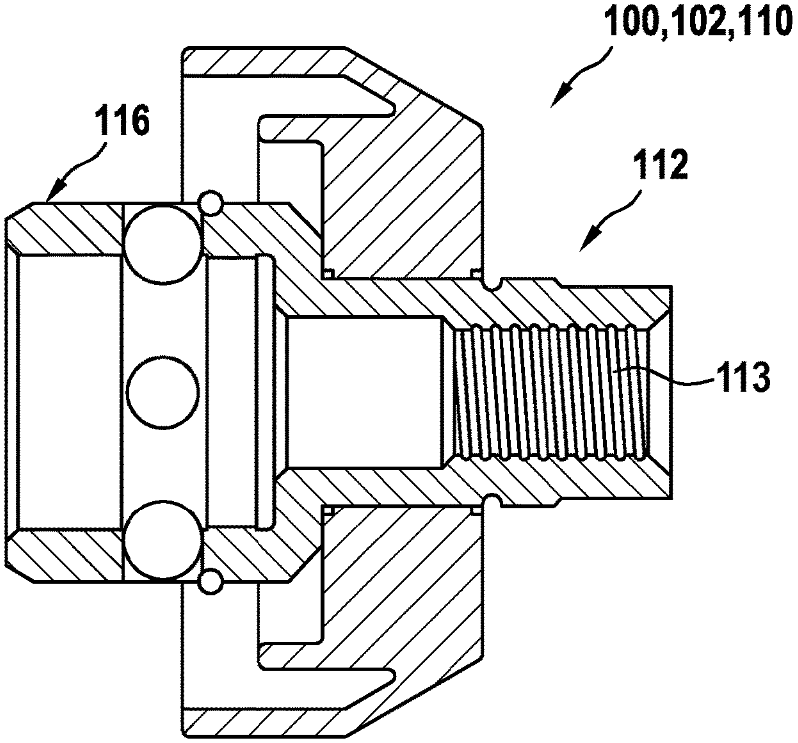
FIG. 3 a longitudinal section through a stirrer-basket receiver.

Another tool receiver 100, which is realized as a stirrer-basket receiver 110, is shown in a longitudinal section in FIG. 3. The stirrer-basket receiver 110 is likewise realized as an interchangeable chuck 102.

The stirrer-basket receiver 110 has an insert-tool interface 112 for releasable connection to an insert tool 26 realized as a stirrer basket 114. The insert-tool interface 112 is realized as an internal thread 113, for example as an M14 thread. The stirrer-basket receiver 110 additionally comprises a hand-held power tool interface 116 for releasable connection to the tool-receiver interface 104 of the hand-held power tool 10. The hand-held power tool interface 116 is preferably substantially identical in design to a hand-held power tool interface of the previously described SDS-plus interchangeable chuck 106. The insert-tool interface 112 and the hand-held power tool interface 116 are arranged on opposite sides of the stirrer-basket receiver 110.

Via the tool-receiver interface 104, the hand-held power tool 10 may be connected to different tool receivers 100 such as, for example, the SDS-plus interchangeable chuck 106 or the stirrer-basket receiver 110. A further tool receiver 100, not represented, is a clamping-jaw interchangeable chuck that is designed for receiving a round-shank drill bit.

Figure 4:
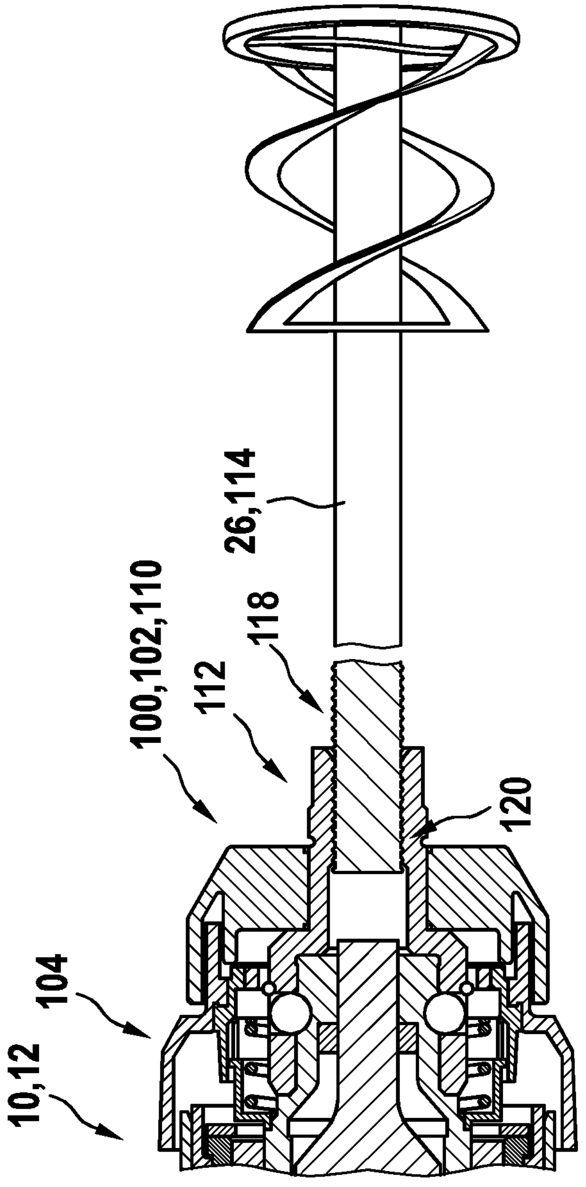
FIG. 4 a longitudinal section through a stirrer basket that is connected to a stirrer-basket receiver.

FIG. 4 shows a section through the hand-held power tool 10, the hand-held power tool 10 being connected to the stirrer-basket receiver 110 and a stirrer basket 114 being connected to the stirrer-basket receiver 110. The stirrer basket 114 has an M14 external thread 118 in the region of an insertion end 120, which is designed so as to correspond to the insert-tool interface 112 of the stirrer-basket receiver 110. The insert-tool interface 112 is realized in such a manner that the mechanical impact mechanism control is not activated. In particular and exemplarily, the insertion end 120 of the stirrer basket 114 is received at a distance from the percussion pin 27, so that the impact mechanism control is not actuated to activate the impact mechanism 24. It can thus be ensured that the stirrer basket 114 executes a purely rotating motion and not a linear oscillating motion.

For operation of the hand-held power tool 10 with an SDS-plus interchangeable chuck 106, which is normally used for drilling or chiseling, settings of the hand-held power tool 10 other than those used in operation of the hand-held power tool 10 with a stirrer-basket receiver 110, which is normally used for stirring, may be advantageous.

A rotary-hammer mode and a stirring mode can therefore be set via the user interface 46. The user interface 46 may have a plurality of rotary-hammer modes and/or a plurality of stirring modes for the user to choose between. The mode may be set, for example, via the operating elements of the user interface 46 on the hand-held power tool 10 or via an app on the smartphone. The rotary-hammer mode and the stirring mode differ, in particular, in a working rotational speed and/or an idling rotational speed. Preferably, different values for a parameter may be set in the stirring mode than in the rotary-hammer mode. For example, the working rotational speed or the idling rotational speed may be set to a different rotational speed in stirring mode than in rotary-hammer mode. In addition, different parameters may be set in stirring mode than in rotary-hammer mode. An example of this would be a stirring time for which the hand-held power tool 10 is operated in the stirring mode, and in which the hand-held power tool may be locked, for example, so that the user does not need to have the operation switch 32 constantly pressed. In this embodiment, the user must select the mode. It would also be conceivable, however, for the tool receiver 100 or the insert tool 26 to be recognized by the hand-held power tool 10 or the external device and for the settings to be effected at least partially automatically.

What is claimed is:

1. A hand-held power tool, comprising:
- a housing in which a drive unit and an impact-mechanism unit are arranged;
- a tool-receiver interface;
- a tool receiver configured as a stirrer-basket receiver that is releasably connectable to the tool-receiver interface; and
- a user interface having an input unit via which an operating mode of the hand-held power tool is selected from a plurality of operating modes, the plurality of operating modes including at least one rotary-hammer mode and at least one stirring mode,
- wherein, in the at least one stirring mode, the hand-held power tool is configured to operate the drive unit for a prespecified stirring time without an operating switch being actuated.

2. The hand-held power tool according to claim 1, wherein the at least one rotary-hammer mode and the at least one stirring mode have different idling rotational speeds.

3. The hand-held power tool according to claim 1, wherein the at least one rotary-hammer mode and the at least one stirring mode have different working rotational speeds.

4. The hand-held power tool according to claim 1, further comprising:
- a battery interface configured to connect to a battery pack.

5. The hand-held power tool according to claim 1, further comprising:
- a communication unit configured to communicate with an external device.

6. The hand-held power tool according to claim 5, wherein the communication unit is configured to communicate wirelessly with the external device.

7. The hand-held power tool according to claim 1, wherein the input unit is arranged on one of the housing of the hand-held power tool and an external device.

8. The hand-held power tool according to claim 1, wherein the user interface is further configured to sense at least one of the tool receiver and an insert tool received in the tool receiver.

9. The hand-held power tool according to claim 1, wherein the stirrer-basket receiver includes a screw thread configured to connect to a stirrer basket.

10. The hand-held power tool according to claim 1, further comprising:

an impact-mechanism control configured such that connection of the stirrer-basket receiver in the tool-receiver interface mechanically disables the impact-mechanism unit.

* * * * *